United States Patent [19]
Yoshikawa

[11] Patent Number: 5,453,941
[45] Date of Patent: Sep. 26, 1995

[54] METHOD AND DEVICE FOR DETECTING AND MEASURING PRESSURE AND COORDINATES IN PRESSURE-SENSITIVE PADS

[75] Inventor: Osamu Yoshikawa, Tokyo, Japan

[73] Assignee: SMK Corporation, Tokyo, Japan

[21] Appl. No.: 229,638

[22] Filed: Apr. 19, 1994

[30] Foreign Application Priority Data

Apr. 23, 1993 [JP] Japan ................................ 5-120883

[51] Int. Cl.6 ................................................ G08C 21/00
[52] U.S. Cl. .......................... 364/558; 178/18; 178/20; 345/173; 345/174
[58] Field of Search .......................... 364/558; 178/18, 178/20, 19; 345/173, 174; 395/155, 161

[56] References Cited

U.S. PATENT DOCUMENTS

| | | | |
|---|---|---|---|
| 4,306,110 | 12/1981 | Nelson et al. | 178/18 |
| 4,484,026 | 11/1984 | Thornburg | 178/18 |
| 4,687,885 | 8/1987 | Talmage, Jr. et al. | 178/18 |
| 4,798,919 | 1/1989 | Miessler et al. | 178/18 |
| 4,801,771 | 1/1989 | Mizuguchi et al. | 200/86 |
| 4,811,243 | 3/1989 | Racine | 364/520 |
| 4,831,566 | 5/1989 | Matthews et al. | 364/571.05 |
| 4,831,568 | 5/1989 | Ito | 364/709.11 |
| 4,929,934 | 5/1990 | Ueda et al. | 340/706 |
| 4,933,660 | 6/1990 | Wynne, Jr. | 338/114 |
| 5,245,139 | 9/1993 | Protheroe et al. | 178/18 |
| 5,324,895 | 6/1994 | Inamori et al. | 178/18 |

FOREIGN PATENT DOCUMENTS

| | | |
|---|---|---|
| 5824977 | 2/1983 | Japan . |
| 5835679 | 3/1983 | Japan . |
| 5899889 | 6/1983 | Japan . |
| 58134377 | 8/1983 | Japan . |
| 5994185 | 5/1984 | Japan . |

*Primary Examiner*—Ellis B. Ramirez
*Assistant Examiner*—Patrick J. Assouad
*Attorney, Agent, or Firm*—Christopher R. Pastel; Thomas R. Morrison

[57] ABSTRACT

A data input resistance pad for measuring coordinates and pressure of a stylus pressed on the pad has X and Y-coordinate resistance boards. The X and Y-coordinate resistance boards are connectable by respective switches to high and low voltage sources at opposite ends of each board. By measuring the voltage at either side of a contact resistance with a high impedance voltage measuring device, a voltage drop across the contact resistance is calculated. This voltage drop represents the contact resistance and therefore the pressure of the stylus. The X position is calculated by measuring the voltage drop from an end of the X-coordinate resistance board to the point of contact. The Y position is calculated by measuring the voltage drop from an end of the Y-coordinate resistance board to the point of contact.

13 Claims, 5 Drawing Sheets

METHOD AND DEVICE FOR DETECTING AND MEASURING PRESSURE AND COORDINATES IN PRESSURE-SENSITIVE PADS

BACKGROUND OF THE INVENTION

This invention relates to a method and device for detecting and measuring both pressure and coordinates in pressure-sensitive resistance pads when written data or diagrams are manually input with a stylus, pen, finger, or other such implement and when the input data is three-dimensional. More specifically, the pad detects the amount of pressure applied in addition to the locus of applied pressure.

Conventional pressure-sensitive pads use fixed voltage detection means for detecting coordinates or fixed current detection means for detecting the pressure.

In the fixed voltage type of pressure-sensitive resistance pad, as described in Japanese Laid-open patent publication SN 4-80411, applying pressure compresses two resistance boards at the point of contact and thereby produces a voltage signal. The voltage signal generated by the pressure is detected and the voltage level is determined. The program which controls the circuit is activated when the voltage signal is detected, and it then determines the x position data, y position data and the amount of pressure applied.

Referring to FIG. 3, a prior art pressure-sensitive pad using fixed voltage detection includes an X-coordinate resistance board 112 having X terminals 111a and 111b along the X-axis direction and Y-coordinate resistance board 114 having Y terminals 113a and 113b along the Y-axis direction. Resistance boards 112 and 114 face each other, and are separated by a small insulating dot spacer.

Pressure from a stylus 110 causes a voltage potential at the terminals of a detection resister 125. More precisely, while waiting for an input, a first X-side switch 115 is closed, a selection switch 119 is switched to X-coordinate detection contact 119x, and a second X-side switch 116, a first Y-side switch 117, and a second Y-side switch 118 are open. In this state, when stylus 110 is not in contact with the pressure-sensitive resistance pad, the voltage potential is zero across the terminals of a detection resistor 125.

When stylus 110 applies pressure to X-coordinate resistance board 112 and Y-coordinate resistance board 114, current flows across detection resistor 125 and generates a potential across the terminals of the resistor. The voltage potential is applied to an A/D converter 120 which sends the digital value to a CPU 123. CPU 123 then determines that a pressure has been detected and activates the program for the detection system.

First X-side switch 115 and second X-side switch 116 are closed in response to a command from CPU 123. Then first Y-side switch 117 and second Y-side switch 118 are opened, and selection switch 119 is switched to X-coordinate detection contact 119x.

When stylus 110 is pressed down on a specified point P, X-coordinate resistance board 112 and Y-coordinate resistance board 114 make contact with each other at point P. The potential $V_x$ at point P can be expressed using a voltage divider equation having resistances $x_1$ and $x_2$ and voltage supply $V_{cc}$. This results in the following expression for $V_x$:

$$V_x = V_{cc} \cdot x_2 / (x_1 + x_2) \quad (1)$$

$V_x$ passes through the $y_2$-side of Y-coordinate resistance board 114 and is used by an analog to digital (A/D) converter circuit 120 to represent the position data of X-coordinate resistance board 112. Reference voltage $V_{ref}$ is also input to A/D converter 120 from a reference voltage terminal 121. The position data is converted to a digital value and sent to CPU 123. CPU 123 uses equation (1) to determine the X-position data which is output through an output terminal 124.

While stylus 110 is still pressing on point P, CPU 123 sends a command that opens first X-side switch 115 and second X-side switch 116, closes first Y-side switch 117 and second Y-side switch 118, and switches selection switch 119 to a Y-coordinate detection contact 119y. The potential $V_y$ at point P can similarly be expressed as:

$$V_y = V_{cc} \cdot y_2 / (y_1 + y_2) \quad (2)$$

Potential $V_y$ passes through the $x_2$-side of the X-coordinate resistance board and is applied to A/D converter 120. Reference voltage $V_{ref}$ is again input to A/D converter circuit 120, converted to a digital value, and sent to CPU 123. CPU 123 uses equation (2) to determine the Y-position data which is output through output terminal 124.

A contact resistance r between the X and Y resistance boards as well as other resistances are negligible because A/D converter circuit 120 and CPU 123 have high input impedances.

Referring to FIG. 4, a prior art pressure-sensitive pad using the fixed current method includes a fixed current source 40 connected to both sides of X-coordinate resistance board 112 via current detection resistors 41 and 42. Both sides of Y-coordinate resistance board 114 are connected to ground via current detection resistors 43 and 44.

In this arrangement, when stylus 110 compresses X-coordinate resistance board 112 and Y-coordinate resistance board 114 at contact points P and Q, the voltage ratios of resistances $x_1$, $x_2$, $y_1$, and $y_2$ are converted to current ratios. The voltages from resistors 41, 42, 43, and 44 are also converted to current values. The CPU monitors the circuit to determine if a pressure has been applied, and if so, it then initiates the programs to calculate the X and Y coordinates.

Each of these prior art methods have certain disadvantages. The fixed voltage method has a simple circuit structure but can not determine the amount of pressure applied by stylus 110. The fixed current method can determine the applied pressure, but the circuit structure and calculations are very complex, making such circuits difficult and expensive to manufacture.

OBJECTS AND SUMMARY OF THE INVENTION

It is an object of the present invention to provide a method and a device for detecting coordinates in pressure-sensitive resistance pads which overcome the drawbacks of the prior art.

It is a further object of the present invention to provide a method and device using a simple circuit which detects the amount of pressure applied in addition to the locus of the applied pressure on a pressure-sensitive pad.

Briefly stated, a data input resistance pad has an X-coordinate resistance board and a Y-coordinate resistance board for measuring coordinates and pressure of a stylus. The X and Y-coordinate resistance boards are connectable by switches to high and low voltage sources (or ground) at opposite ends of each board. A contact resistance is calculated by measuring the voltage at either side of a contact resistance with a high impedance voltage measuring device.

The pressure of the stylus is determined from the contact resistance. The X position is calculated by measuring the voltage drop from an end of the X-coordinate resistance board to the point of contact. The Y position is calculated by measuring the voltage drop from an end of the Y-coordinate resistance board to the point of contact.

An embodiment of the present invention is a device for detecting and measuring an applied pressure on an X–Y coordinate resistance pad. The device includes an X-coordinate resistance board having a first end and a second end and a Y-coordinate resistance board having a first end and a second end. The X-coordinate resistance board and the Y-coordinate resistance boards are substantially parallel and substantially uniformly spaced so that a pressure applied against a point located on the X-coordinate resistance board causes the X-coordinate resistance board to make contact with the Y-coordinate resistance board at a point located on the Y-coordinate resistance board. The contact is through a contact resistance. The first end of said X-coordinate resistance board is connected to a high voltage source by a first switch and the second end of the X-coordinate resistance board is connected to a low voltage source (or ground) by a second switch. The first end of the Y-coordinate resistance board is connected to the high voltage source by a third switch and the second end of the Y-coordinate resistance board is connected to the low voltage source (or ground) by a fourth switch.

The device includes an output which is selectively connected to one of the second end of the X-coordinate resistance board and the first end of the Y-coordinate resistance board. The device also includes means for closing the first and fourth switches and opening the second and third switches. The device further includes means for measuring a detection voltage at the output and determining when the detection voltage differs either from the high voltage source when the output is selectively connected to the second end of the X-coordinate resistance board, or from the low voltage source (or ground) when the output is selectively connected to the first end of the Y-coordinate resistance board.

The device includes means for measuring a first voltage at the output when the output is selectively connected to the second end of the X-coordinate resistance board, and means for measuring a second voltage when the output is selectively connected to the first end of the Y-coordinate resistance board. The device also includes means for subtracting the second voltage from the first voltage to determine a contact resistance voltage drop.

An embodiment of the present invention is a device for detecting pressure on a pressure-sensitive resistance pad. The device includes an X-coordinate resistance board coupled to a high voltage source via a first switch at a first end of the X-coordinate resistance board and to a low voltage source or ground via a second switch at a second end of the X-coordinate resistance board. A Y-coordinate resistance board is coupled to the high voltage source via a third switch at a first end of the Y-coordinate resistance board and to the low voltage source or ground via a fourth switch at a second end of the Y-coordinate resistance board. The first and fourth switches constitute a first pair of switches and the second and third switches constitute a second pair of switches. The X-coordinate resistance board is arranged close to the Y-coordinate resistance board with a uniform space between.

The device includes means for closing one of the first and second pair of switches and means for detecting a contact between the X-coordinate resistance board and the Y-coordinate resistance board. The device includes means for measuring voltages at the second end of the X-coordinate resistance board and the first end of the Y-coordinate resistance board when the first pair of switches is closed and the contact is detected. The device also includes means for measuring voltages at the first end of the X-coordinate resistance board and the second end of the Y-coordinate resistance board when the second pair of switches is closed and the contact is detected.

The device further includes means for closing the first and second switches and measuring a third voltage at one of the ends of the Y-coordinate resistance board when the contact is detected, and means for closing the third and fourth switches and measuring a fourth voltage at one of the ends of the X-coordinate resistance board. Finally, the device includes means for calculating a contact resistance voltage drop as well as X and Y coordinates of a stylus from the first, second, third and fourth voltages.

Another embodiment of the present invention is a method for detecting and measuring applied pressure on a pressure-sensitive resistance pad. The method includes:

(1) connecting an X-coordinate resistance board to a high voltage source via a first switch at a first end of the X-coordinate resistance board and to a low voltage source or ground via a second switch at a second end of the X-coordinate resistance board, (2) connecting a Y-coordinate resistance board to the high voltage source via a third switch at a first end of the Y-coordinate resistance board and to the low voltage source or ground via a fourth switch at a second end of the Y-coordinate resistance board, (3) constituting a first pair of switches from the first and fourth switches, (4) constituting a second pair of switches from the second and third switches, (5) arranging the X-coordinate resistance board closely and transversely to the Y-coordinate resistance board and maintaining a uniform gap between them, (6) detecting a contact between the X-coordinate resistance board and the Y-coordinate resistance board, (7) either closing the first pair of switches and measuring first and second voltages at the second end of the X-coordinate resistance board and at the first end of the Y-coordinate resistance board, or closing the second pair of switches and measuring first and second voltages at the first end of the X-coordinate resistance board and the second end of the Y-coordinate resistance board, (8) closing the first and second switches and measuring a third voltage at one of the first and second ends of the Y-coordinate resistance board, (9) closing the third and fourth switches and measuring a fourth voltage at one of the first and second ends of the X-coordinate resistance board, and

(10) calculating a contact resistance voltage drop from the first, second, third and fourth voltages.

An embodiment of the invention is a method for detecting and measuring an applied pressure on an X–Y coordinate resistance pad, including:

arranging an X-coordinate resistance board and a Y-coordinate resistance board substantially parallel and substantially uniformly spaced;

the applied pressure deforming the X-coordinate resistance board so that it makes contact with the Y-coordinate resistance board through a contact resistance;

connecting a first end of the X-coordinate resistance board to a high voltage source through a first switch;

connecting a second end of the X-coordinate resistance board to a low voltage source through a second switch;

connecting a first end of the Y-coordinate resistance board to a high voltage source through a third switch;

connecting a second end of the Y-coordinate resistance board to a low voltage source through a fourth switch;

closing the first and fourth switches;

selectively connecting an output to one of the second end of the X-coordinate resistance board and the first end of the Y-coordinate resistance board;

measuring a detection voltage at the output;

determining when the detection voltage differs from either the high voltage source or the low voltage source depending on whether the output is selectively connected to the second end of the X-coordinate resistance board or the first end of said Y-coordinate resistance board, respectively;

opening the second and third switches;

selectively connecting the output to the second end of the X-coordinate resistance board and measuring a first voltage at the output;

selectively connecting the output to the first end of the Y-coordinate resistance board and measuring a second voltage at the output; and subtracting the second voltage from the first voltage, thereby obtaining a contact resistance voltage drop.

The above and other objects, features and advantages of the present invention will become apparent from the following description read in conjunction with the accompanying drawings in which like reference numerals designate the same elements.

DETAILED DESCRIPTION OF THE PREFERRED EMBODIMENT

Figure 1:
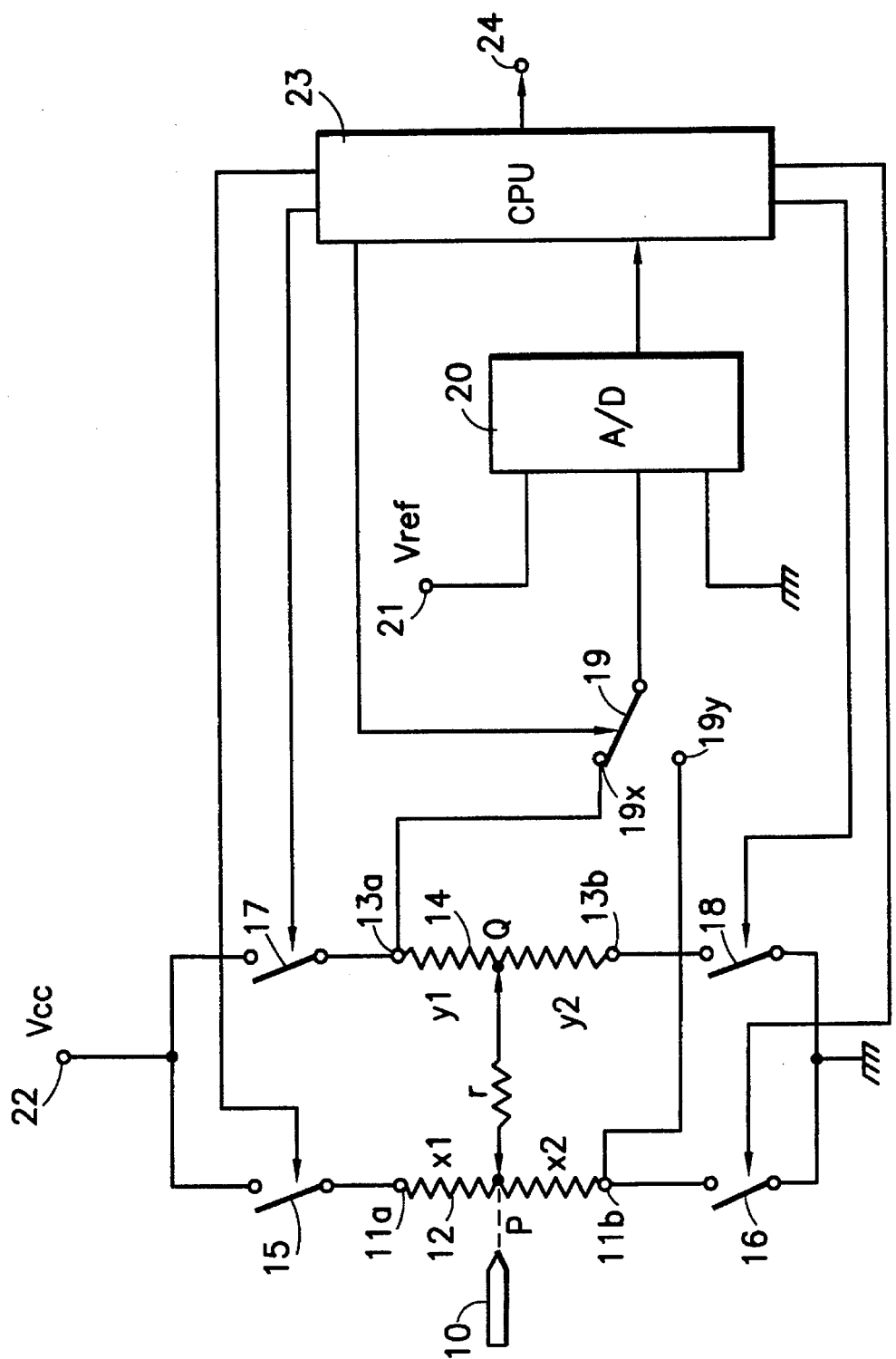
FIG. 1 shows a circuit diagram of a circuit for an X–Y coordinate resistance pad according to an embodiment of the present invention.

Referring to FIG. 1, an X-coordinate resistance board 12 has a pair of terminals 11a and 11b connected to its opposite ends along an X axis. A Y-coordinate resistance board 14 has a pair of terminals 13a and 13b connected to its opposite ends along a Y axis.

Any conventional means for connecting may be used, whether a cable or equivalent, metal vapor deposition or equivalent, or the like. Terminal 11a is connected to a voltage supply terminal 22 through a first X-side switch 15, and terminal 11b is connected to ground through a second X-side switch 16. Terminal 13a is connected to a voltage supply terminal 22 through first Y-side switch 17, and terminal 13b is connected to ground through a second Y-side switch 18.

Terminal 13a is connected to an X-coordinate detection contact 19x of selection switch 19. Terminal 11b is connected to a Y-coordinate detection contact 19y of selection switch 19. A common terminal of selection switch 19 is connected to an A/D converter 20. An output of A/D converter 20 is connected to a CPU 23. CPU 23 controls the switching sequence of first X-side switch 15, second X-side switch 16, first Y-side switch 17, second Y-side switch 18, and selection switch 19.

Figure 2C:
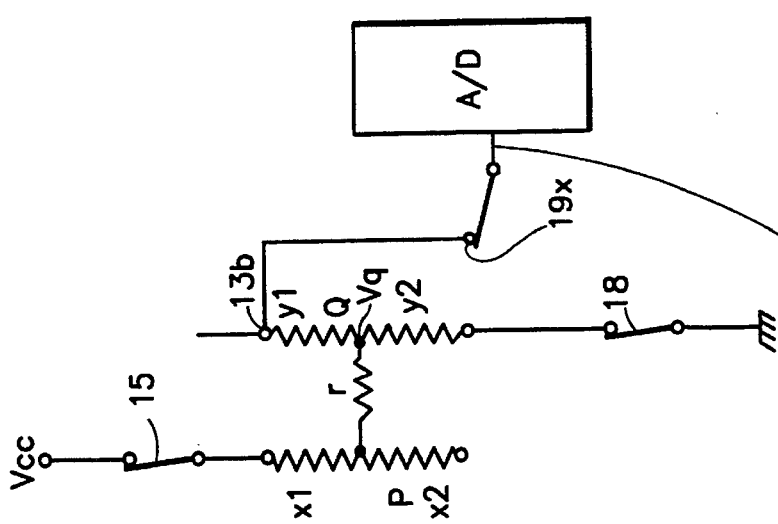
FIG. 2(c) shows an equivalent circuit diagram illustrating a mode for detecting the amount of applied pressure according to a method for detecting coordinates and pressure using the X–Y coordinate resistance pad of FIG. 1.
Figure 2B:
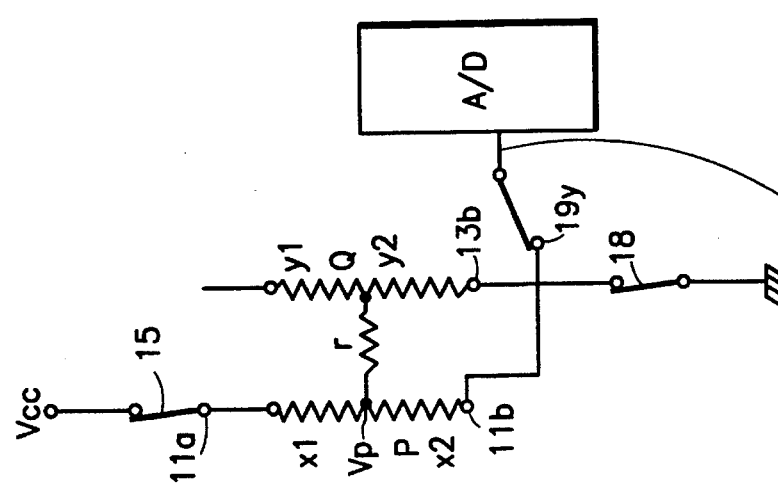
FIG. 2(b) shows an equivalent circuit diagram, illustrating a mode for detecting a pressure from a stylus using the X–Y coordinate resistance pad of FIG. 1.
Figure 2A:
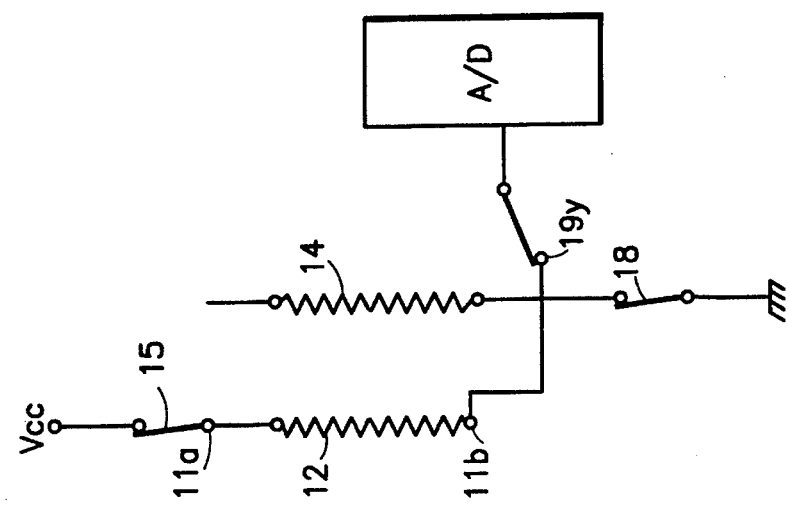
FIG. 2(a) shows an equivalent circuit diagram, illustrating an input standby mode of the X–Y coordinate resistance pad of FIG. 1.

Referring to FIG. 2(a), when the resistance pad is in input standby mode, first X-side switch 15 and second Y-side switch 18 are closed. Selection switch 19 is switched to Y-coordinate detection contact 19y. Since there is no current path to ground, there is no power loss while in standby mode. Since there is no voltage drop, source voltage $V_{cc}$ at voltage supply terminal 22 is applied directly to A/D converter 20.

Since the contact resistance r is directly proportional to the pressure of a stylus 10, determining the voltage drop across a contact resistance r will produce a unique value which represents the stylus pressure. A method of determining a value for $V_r$ consists of determining values for $V_p$ and $V_q$ and then using the equation $$V_r = V_p - V_q$$

to calculate $V_r$.

Referring to FIG. 2(b), when stylus 10 or other device applies pressure to X-coordinate resistance board 12, X-coordinate resistance board 12 touches Y-coordinate resistance board 14 at a point P. Current flows from $V_{cc}$ to ground through a resistance x1, contact resistance r, and a resistance $y_2$. A voltage $V_p$ at point P is applied to A/D converter 20 and converted to digital form. CPU 23 recognizes the voltage drop and activates a controlling program for a detection circuit. $V_p$ is stored in memory in CPU 23 since it is required to calculate the force of the applied pressure. The controlling program then determines the amount of pressure applied by stylus 10 by measuring a value of $V_q$.

Referring now to FIG. 2(c), selection switch 19 is switched to Y-coordinate detection contact 19x while leaving first X-side switch 15 and second Y-side switch 18 closed. Current flows from $V_{cc}$ to ground through resistance $x_1$, contact resistance r, and resistance $y_2$. Voltage $V_q$ at point Q is applied to A/D converter 20 and converted to digital form. $V_q$ is stored in memory in CPU 23. CPU 23 then uses the values representing $V_p$ and $V_q$ to calculate voltage drop $V_r$ which represents the voltage drop across the contact resistance r. This value represents the force of the applied pressure from stylus 10 and is stored in memory in CPU 23. The controlling program now determines a value for the X coordinate of the stylus.

Figure 2E:
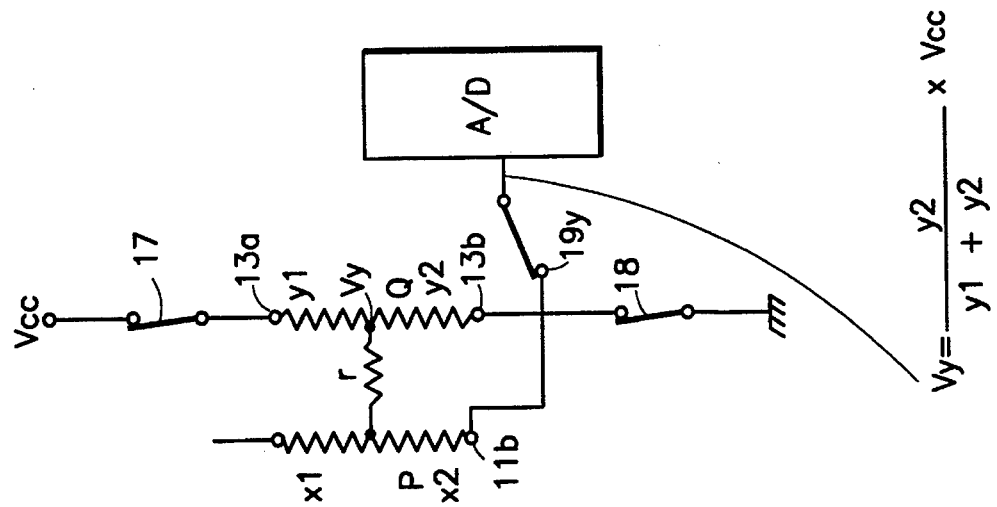
FIG. 2(e) equivalent circuit diagram illustrating a Y-coordinate detection mode according to a method for detecting coordinates using the X–Y coordinate resistance pad of FIG. 1.
Figure 2D:
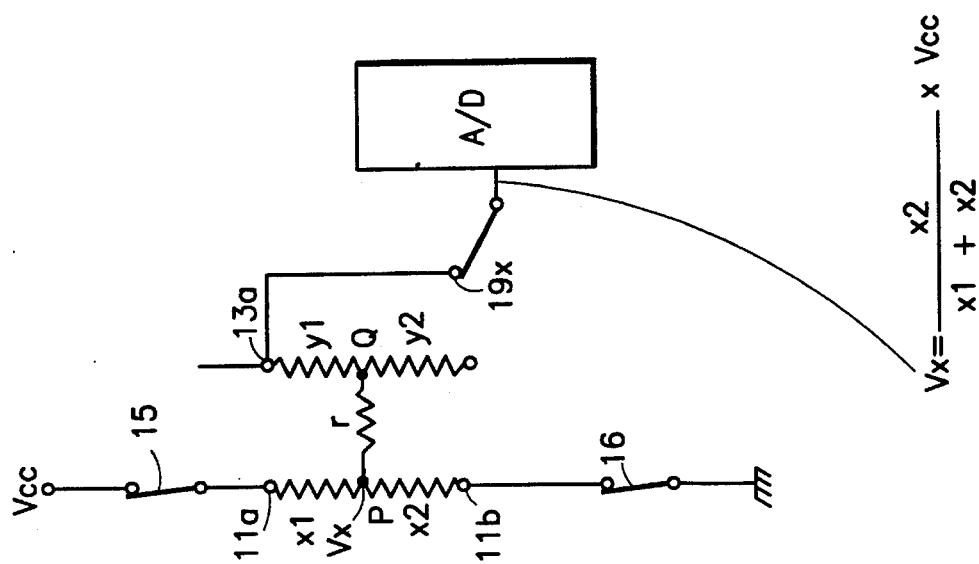
FIG. 2(d) shows an equivalent circuit diagram illustrating an X-coordinate detection mode according to a method for detecting coordinates using the X–Y coordinate resistance pad of FIG. 1.
Figure 3:
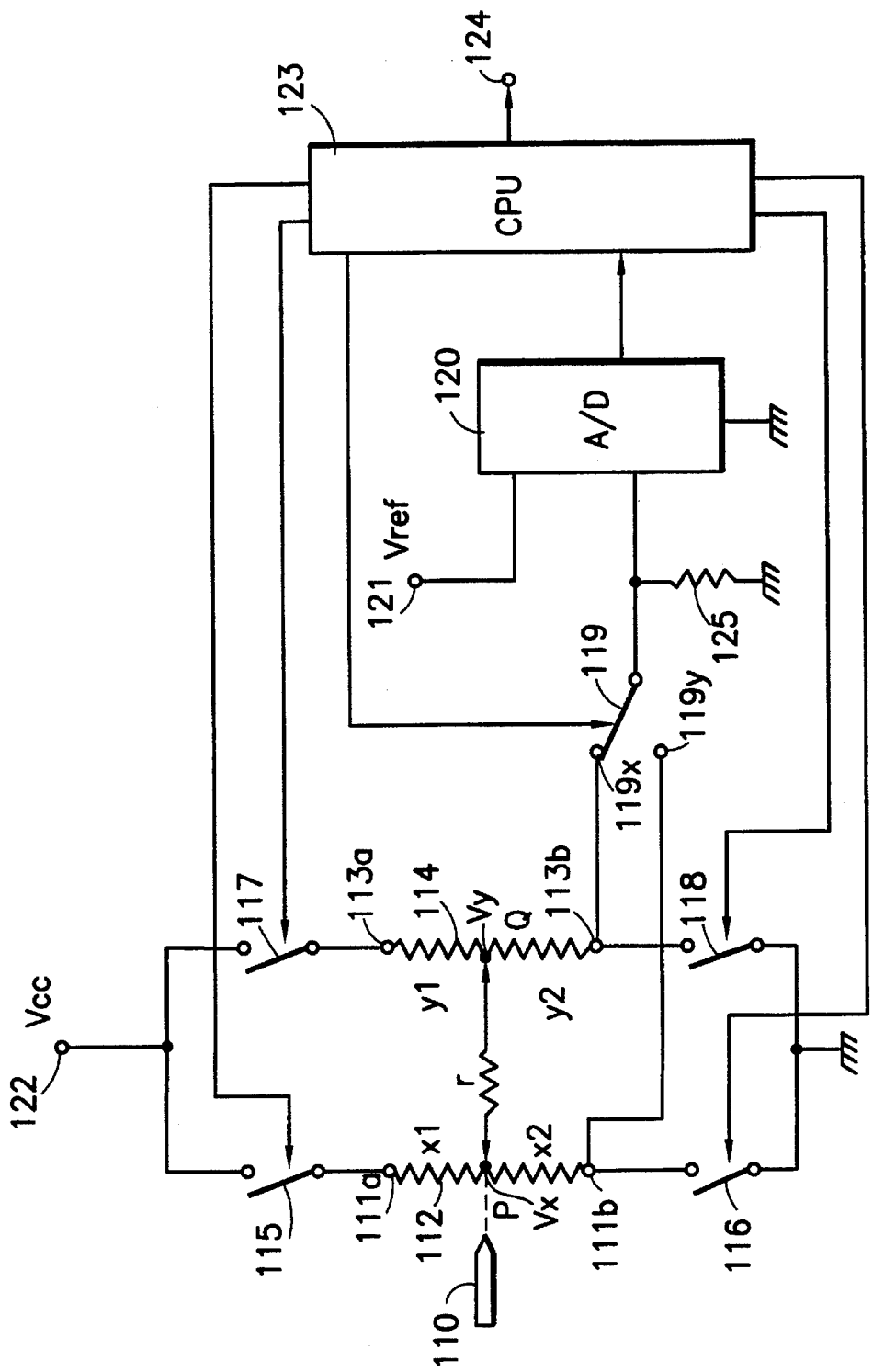
FIG. 3 shows a prior art circuit diagram of a fixed voltage detection resistance pad.
Figure 4:
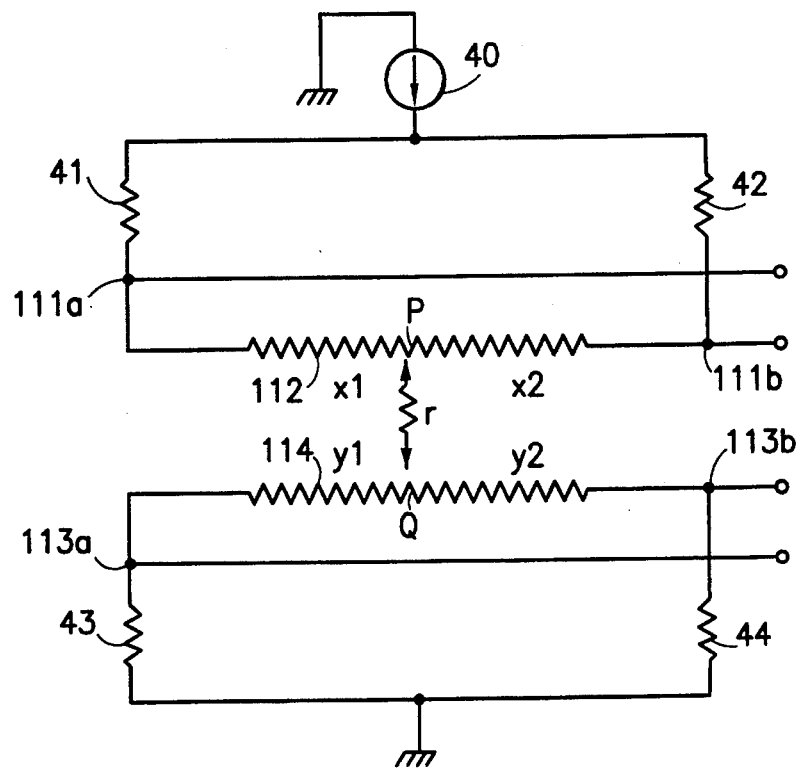
FIG. 4 shows a prior art circuit diagram of a fixed current detection pressure-sensitive resistance pad.
Figure 5:
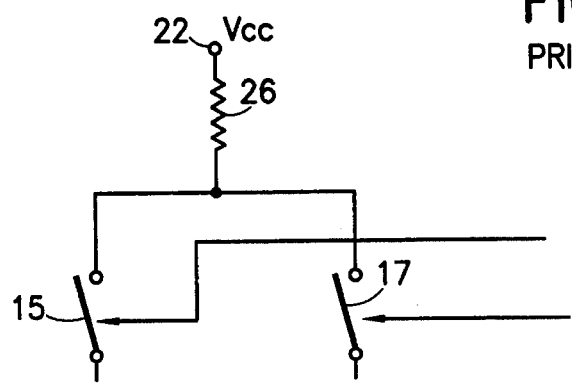
FIG. 5 shows a fixed resistance added to the circuit diagram of FIG. 1.
Figure 6:
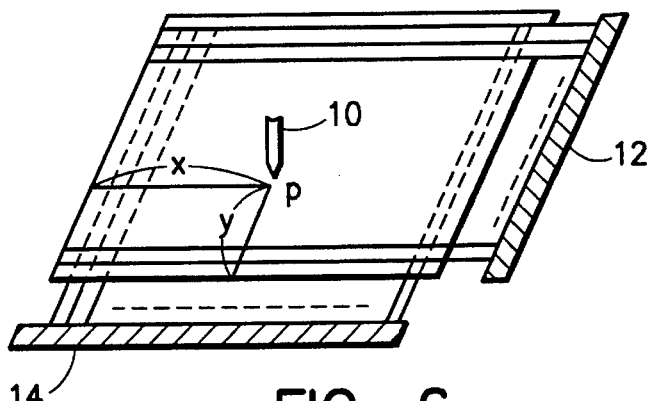
FIG. 6 shows a pressure sensitive resistance pad according to an embodiment of the invention.

Referring to FIG. 2(d), first X-side switch 15 and selection switch 19 are left in the closed position, and first Y-side switch 17 is left open. Second X-side switch 16 is closed and second Y-side switch 18 is opened. In this configuration, current flows from voltage supply terminal 22 to ground through X-coordinate resistance board 12. Using the conventional equation for a voltage divider, the voltage $V_x$ at point P is expressed as $$V_x = V_{cc} \cdot x_2/(x_1+x_2)$$

and represents the X-position coordinate. Voltage $V_x$ is applied to A/D converter 20, converted to digital form, sent to CPU 23, and stored in memory. The controlling program now determines the Y-coordinate of stylus 10.

Referring to FIG. 2(e), first X-side switch 15 and second X-side switch 16 are opened while first Y-side switch 17 and second Y-side switch 18 are closed. Selection switch 19 is switched to Y-coordinate detection contact 19y. In this configuration, current flows from voltage supply terminal 22 to ground through Y-coordinate resistance board 14. Again using the conventional equation for a voltage divider, the voltage $V_y$ at point Q is expressed as $$V_y = V_{cc} \cdot y_2/(y_1+y_2)$$

and represents the Y-position coordinate. Voltage $V_y$ is applied to A/D converter 20, converted to digital form, sent to CPU 23, and stored in memory. The controlling program then outputs the final data consisting of the X and Y coordinate values and the stylus pressure value via output terminal 24.

After the final calculation, the detection circuit returns to the input standby mode.

There is always some non-zero resistance between voltage supply terminal 22, X terminal 11a and contact resistance r at the surface of X-coordinate resistance board 12. Therefore, voltages $V_p$ or $V_x$ are never identical to $V_{cc}$, and detection is possible. If necessary, a fixed resistance is inserted between voltage supply terminal 22 and X terminal 11a to facilitate detection.

In the above embodiment, a stylus was used to apply pressure to the pressure-sensitive pad. A pen, finger, or other such implement can also be used.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for detecting and measuring an applied pressure on an X–Y coordinate resistance pad, comprising:

an X-coordinate resistance board having a first end and a second end;

a Y-coordinate resistance board having a first end and a second end;

said X-coordinate resistance board and said Y-coordinate resistance boards being substantially parallel and substantially uniformly spaced;

a contact resistance formed by said applied pressure deforming said X-coordinate resistance board so that said X-coordinate resistance board makes contact with said Y-coordinate resistance board;

said contact resistance being inversely proportional to said applied pressure;

said first end of said X-coordinate resistance board being connected to a high voltage source by a first switch;

said second end of said X-coordinate resistance board being connected to a low voltage source by a second switch;

said first end of said Y-coordinate resistance board being connected to said high voltage source by a third switch;

said second end of said Y-coordinate resistance board being connected to said low voltage source by a fourth switch;

an output;

means for selectively connecting said output to one of said second end of said X-coordinate resistance board and said first end of said Y-coordinate resistance board;

means for closing said first and fourth switches and opening said second and third switches;

means for measuring a detection voltage at said output and determining when said detection voltage differs from one of said high voltage source if said output is selectively connected to said second end of said X-coordinate resistance board and said low voltage source if said output is selectively connected to said first end of said Y-coordinate resistance board;

means for measuring a first voltage at said output when said output is selectively connected to said second end of said X resistance board;

means for measuring a second voltage at said output when said output is selectively connected to said first end of said Y-coordinate resistance board; and means for subtracting said second voltage from said first voltage to obtain a contact resistance voltage drop.

2. A device according to claim 1, further comprising a fixed resistor connected in series between said high voltage source and said first end of said X-coordinate resistance board.

3. A method for detecting and measuring an applied pressure on an X–Y coordinate resistance pad, comprising:

arranging an X-coordinate resistance board and a Y-coordinate resistance board substantially parallel and substantially uniformly spaced;

said applied pressure deforming said X-coordinate resistance board so that said X-coordinate resistance board makes contact with said Y-coordinate resistance board through a contact resistance;

said contact resistance being inversely proportional to said applied pressure;

connecting a first end of said X-coordinate resistance board to a high voltage source through a first switch;

connecting a second end of said X-coordinate resistance board to a low voltage source through a second switch;

connecting a first end of said Y-coordinate resistance board to a high voltage source through a third switch;

connecting a second end of said Y-coordinate resistance board to a low voltage source through a fourth switch;

closing said first and fourth switches;

selectively connecting an output to one of said second end of said X-coordinate resistance board and said first end of said Y-coordinate resistance board;

measuring a detection voltage at said output;

determining when said detection voltage differs from one of said high voltage source when said output is selectively connected to said second end of said X-coordinate resistance board and said low voltage source when said output is selectively connected to said first end of said Y-coordinate resistance board;

opening said second and third switches;

selectively connecting said output to said second end of said X-coordinate resistance board and measuring a first voltage at said output;

selectively connecting said output to said first end of said Y-coordinate resistance board and measuring a second voltage at said output; and subtracting said second voltage from said first voltage, thereby obtaining a contact resistance voltage drop.

4. A device for detecting pressure on a pressure-sensitive resistance pad, comprising:

an X-coordinate resistance board coupled to a high voltage source via a first switch at a first end of said X-coordinate resistance board and to a low voltage source via a second switch at a second end of said X-coordinate resistance board;

a Y-coordinate resistance board coupled to said high voltage source via a third switch at a first end of said Y-coordinate resistance board and to said low voltage source via a fourth switch at a second end of said Y-coordinate resistance board;

said first and fourth switches constituting a first pair of switches;

said second and third switches constituting a second pair of switches;

said X-coordinate resistance board being arranged close to said Y-coordinate resistance board with a uniform gap therebetween;

first means for closing one of said first and second pair of switches;

means for detecting a contact between said X-coordinate resistance board and said Y-coordinate resistance board;

first means for measuring voltages at each of said X-coordinate resistance board second end and said Y-coordinate resistance board first end when said first pair of switches is closed and said contact is detected;

second means for measuring first and second voltages at each of said X-coordinate resistance board first end and said Y-coordinate resistance board second end when said second pair of switches is closed and said contact is detected;

second means for closing said first and second switches and measuring a third voltage at one of said Y-coordinate resistance board first and second ends when said contact is detected;

third means for closing said third and fourth switches and measuring a fourth voltage at one of said X-coordinate resistance board first and second ends when said contact is detected;

means for calculating a contact resistance voltage drop from said first, second, third and fourth voltages; and said contact resistance voltage drop being inversely proportional to said pressure.

5. A device for detecting pressure on a pressure-sensitive resistance pad as in claim 4, wherein said first and second measuring means include an analog-to-digital converter and a microprocessor.

6. A device for detecting pressure on a pressure-sensitive resistance pad as in claim 4, wherein:

said first and second measuring means include means for closing a selection switch;

a common terminal of said selection switch being coupled to an A/D converter;

one of a second and a third terminal of said selection switch being coupled to said X-coordinate resistance board first end; and other of said second and third terminals being coupled to said Y-coordinate resistance board second end.

7. A device for detecting pressure on a pressure-sensitive resistance pad as in claim 4, wherein:

said first and second measuring means include means for closing a selection switch;

a common terminal of said selection switch being coupled to an A/D converter;

one of a second and a third terminal of said selection switch being coupled to said X-coordinate resistance board second end; and other of said second and third terminals being coupled to said Y-coordinate resistance board first end.

8. A device for detecting pressure on a pressure-sensitive resistance pad as in claim 4, wherein said detecting means includes:

third means for measuring a change in voltage at one of said X-coordinate resistance board second end and said Y-coordinate resistance board first end when said first pair of switches is closed; and fourth means for measuring a change in voltage at one of said X-coordinate resistance board first end and said Y-coordinate resistance board second end when said second pair of switches is closed.

9. A method for detecting pressure on a pressure-sensitive resistance pad, comprising:

connecting an X-coordinate resistance board to a high voltage source via a first switch at a first end of said X-coordinate resistance board and to a low voltage source via a second switch at a second end of said X-coordinate resistance board;

connecting a Y-coordinate resistance board to said high voltage source via a third switch at a first end of said Y-coordinate resistance board and to said low voltage source via a fourth switch at a second end of said Y-coordinate resistance board;

said first and fourth switches constituting a first pair of switches;

said second and third switches constituting a second pair of switches;

arranging said X-coordinate resistance board close to said Y-coordinate resistance board, maintaining a uniform gap therebetween;

closing one of said first and second pair of switches;

detecting a contact between said X-coordinate resistance board and said Y-coordinate resistance board;

measuring voltages at each of said X-coordinate resistance board second end and said Y-coordinate resistance board first end when said first pair of switches is closed and said contact is detected;

measuring first and second voltages at each of said

X-coordinate resistance board first end and said Y-coordinate resistance board second end when said second pair of switches is closed and said contact is detected;

closing said first and second switches and measuring a third voltage at one of said Y-coordinate resistance board first and second ends when said contact is detected;

closing said third and fourth switches and measuring a fourth voltage at one of said X-coordinate resistance board first and second ends when said contact is detected;

calculating a contact resistance voltage drop from said first, second, third and fourth voltages; and said contact resistance voltage drop being inversely proportional to said pressure.

10. A method as in claim 9, wherein said step of detecting includes:

measuring a change in voltage at one of said X-coordinate resistance board second end and said Y-coordinate resistance board first end when said first pair of switches is closed; and measuring a change in voltage at one of said X-coordinate resistance board first end and said Y-coordinate resistance board second end when said second pair of switches is closed.

11. A method as in claim 10, further comprising:

calculating an X coordinate from said third voltage; and calculating a Y coordinate from said fourth voltage.

12. A method as in claim 9, further comprising calculating a force of said contact from said contact resistance.

13. A method as in claim 9, further comprising:

calculating an X coordinate from said third voltage; and calculating a Y coordinate from said fourth voltage.

* * * * *